US008513852B2

(12) United States Patent
Klumpp et al.

(10) Patent No.: US 8,513,852 B2
(45) Date of Patent: Aug. 20, 2013

(54) COMMUTATION DEVICE AND ELECTRIC MACHINE

(75) Inventors: Daniel Klumpp, Baden-Baden (DE); Erwin Sinni, Meimsheim (DE); Anita Seebacher, Beuhlertal (DE)

(73) Assignee: Robert Bosch GmbH, Stuttgart (DE)

( * ) Notice: Subject to any disclaimer, the term of this patent is extended or adjusted under 35 U.S.C. 154(b) by 364 days.

(21) Appl. No.: 12/678,599

(22) PCT Filed: Jul. 22, 2008

(86) PCT No.: PCT/EP2008/059559
§ 371 (c)(1), (2), (4) Date: Jun. 10, 2010

(87) PCT Pub. No.: WO2009/037027
PCT Pub. Date: Mar. 26, 2009

(65) Prior Publication Data

US 2010/0244620 A1 Sep. 30, 2010

(30) Foreign Application Priority Data

Sep. 17, 2007 (DE) ......................... 10 2007 044 347
May 28, 2008 (DE) ......................... 10 2008 002 030

(51) Int. Cl.
*H01R 39/38* (2006.01)
*H02K 13/00* (2006.01)

(52) U.S. Cl.
USPC ............................ 310/239; 310/228; 310/242

(58) Field of Classification Search
USPC .......................................... 310/239, 228, 242
See application file for complete search history.

(56) References Cited

U.S. PATENT DOCUMENTS

| | | | | |
|---|---|---|---|---|
| 1,962,412 | A * | 6/1934 | Sanders | 310/228 |
| 2,050,735 | A * | 8/1936 | Sanders | 310/228 |
| 4,086,510 | A * | 4/1978 | Watanabe | 310/242 |
| 4,142,120 | A | 2/1979 | Hallerback | |
| 6,097,128 | A | 8/2000 | Ko | |
| 7,573,174 | B2 | 8/2009 | Braml et al. | |
| 7,915,782 | B2 | 3/2011 | Höfel et al. | |
| 2008/0001493 | A1 * | 1/2008 | Braml et al. | 310/239 |

FOREIGN PATENT DOCUMENTS

| | | |
|---|---|---|
| CN | 1350714 | 5/2002 |
| EP | 1 873 890 | 1/2008 |
| JP | 50-45602 | 8/1948 |
| JP | 50-1804 | 1/1975 |
| JP | 61-199173 | 12/1986 |
| JP | 5-287941 | 11/1993 |
| JP | 10-322958 | 12/1998 |
| JP | 2009 510982 | 3/2009 |

* cited by examiner

*Primary Examiner* — Tran Nguyen
*Assistant Examiner* — Alex W Mok
(74) *Attorney, Agent, or Firm* — Merchant & Gould P.C.

(57) ABSTRACT

The invention relates to a commutation device (1) having a rotatable commutator (2) and at least one grinding element (16, 17, 18, 19) contacting the commutator (2). According to the invention, means (21) for removing abrasion debris (20) occurring during commutation are provided. The invention further relates to an electric machine having a commutation device (1) of said kind.

14 Claims, 3 Drawing Sheets

COMMUTATION DEVICE AND ELECTRIC MACHINE

This application is a National Stage Application of PCT/EP 2008/059559, filed 22 Jul. 2008, which claims benefit of Serial No. 10 2007 044 347.3, filed 17 Sep. 2007 in Germany and Serial No. 10 2008 002 030.3, filed 28 May 2008 in Germany and which applications are incorporated herein by reference. To the extent appropriate, a claim of priority is made to each of the above disclosed applications.

TECHNICAL FIELD

The invention relates to a commutation device as well as to an electric machine, particularly an electric motor or a generator.

In electrotechnology a device for the commutation of current in electric machines constitutes a commutation device. The current commutation produces a rotating or migrating current with respect to the armature winding. Known commutation devices comprise a commutator fixed in a torque-proof manner on an armature shaft with a plurality of segments, which are arranged side by side in a circumferential direction and are electrically insulated from one another. Said segments are electrically contacted by at least two grinding elements. Abrasion debris, as a rule powdered carbon, occurs as a result of the constant friction between the fixed grinding elements and the rotationally driven commutator. Viewed in the direction of rotation of the commutator, said debris settles in front of the grinding elements, which leads to a pre-commutation and thereby to a reduction in the runtime of an electric machine equipped with a commutation device of said kind. In addition the resulting abrasion debris settles in air, respectively insulating, gaps between in each case two segments arranged adjacently in the circumferential direction, which can lead to short circuits.

SUMMARY

Technical Aim

The aim underlying the invention is to propose a commutation device, with which pre-commutations resulting from abrasion debris deposits are avoided. In addition, it is the aim of the invention to propose a correspondingly improved electric machine.

Technical Solution

The idea underlying the invention is to prevent the deposit of abrasion debris, in particular powdered carbon, occurring during commutation onto the commutator by providing means for removing said debris. In so doing, said means are preferably configured such that the abrasion debris is removed in the radial direction outwards. By removing the abrasion debris, deposits on the commutator and/or on the sliding contacts are avoided and in so doing so are pre-commutations. This in turn leads to an increase in the runtime of an electric machine equipped with a commutation device configured according to the concept of the invention. In addition the deposit of the abrasion debris in insulating gaps between segments arranged side by side in a circumferential direction and resulting electrical short circuits are avoided.

An embodiment is especially advantageous, wherein the means for removing the abrasion debris occurring during commutation comprise at least one spring that rests on the commutator, the spring being preferably embodied from an electrically non-conductive material in order to avoid short circuits. The depositing of abrasion debris in front of the at least one grinding element on the commutator is successfully prevented by the spring resting on the commutator. Said spring, particularly when configured as a leaf spring, furthermore serves as a kind of guide plate for removing the abrasion debris outwards. As is to be explained later in the application, an embodiment having means that do not rest on the commutator can also be implemented.

The spring is preferably configured and arranged such that starting at its fixed position it extends in the direction of its free end in the circumferential direction of the commutator and is arranged curved in the direction of the commutator or slanting radially inwardly. In so doing, a spring force can be applied to the commutator, particularly in the radial direction, which makes sure that the spring rests on the outer circumference of the commutator when said commutator is turning. Abrasion debris is consequently prevented from slipping below and past the spring. By providing at least one spring, which removes the abrasion debris radially outwards, it is possible to integrate the means for removing the abrasion debris into the installation space available, whereby the electric machine, which is equipped with a commutation device according to the invention, does not have to be built larger than without the means for removing the abrasion debris. It is thereby advantageous for the spring, in particular one configured as a leaf spring, to be fixed at its end facing away from the commutator to a component of the commutation device, in particular to a grinding element holder (and preferably externally on said holder to a casing for the grinding element) and to rest on the commutator at its free end, respectively in the region of its free end.

An embodiment is particularly preferred, wherein the means, particularly the spring(s), are/is constructed from an electrically non-conductive plastic.

In order to successfully prevent a deposit of abrasion debris across the entire longitudinal extension of the commutator, an embodiment is advantageous, wherein the width of the means, in particular the spring(s), at least approximately corresponds to the axial extension of the commutator, respectively the axial extension of the segments of the commutator arranged side by side in the circumferential direction. An embodiment is likewise possible, wherein the means, preferably the spring(s), project/projects beyond the commutator in the axial direction on one or both sides.

In order to be able to assure a smooth start-up in the region of the free end of the means, in particular of the at least one spring, an embodiment is advantageous, wherein the means, preferably the spring(s), have a curved or oblique leading edge in the region of their free end that rests on the commutator. Beside a smooth start-up, the removal of the abrasion debris in the radial direction is better assured by chamfering, respectively curving, the free end in the direction away from the commutator. As will be explained later in the application, an embodiment can also be implemented, wherein the means are arranged with a (small) radial clearance to the commutator.

Provision is advantageously made in a modification of the invention for the commutation device to be provided with a grinding element holder having a plurality of casings for accepting in each case one grinding element, which in particular contains graphite. In order to prevent the deposit of abrasion debris in front of each grinding element as viewed in the rotational direction of the commutator, an embodiment is advantageous, wherein means for removing abrasion debris, preferably a spring that rests on the commutator, are associated with at least one grinding element, preferably each grinding element. In so doing, the respective means, in particular the respective spring, are preferably disposed in front of the associated grinding element, respectively in front of the casing holding the grinding element, as viewed in the rotational direction of the commutator. An arrangement of the means, in particular of the springs, is thereby advantageous, wherein said means starting from the respective casing, preferably starting from their attachment point, extend in the circumferential direction opposite to the rotational direction of the commutator.

An embodiment is particularly advantageous, wherein the means, preferably the springs, are fixed to the grinding element holder especially at the end facing away from the commutator. In so doing, it is within the scope of the modification to integrally configure the means with the grinding element holder or to provide an option for attaching the means, in particular the springs, to the grinding element holder, which allows for the replacement of the means, in particular of the springs, so that the means, in particular the springs, can be renewed in case of wear.

In the event that the grinding element holder is configured such that the means, in particular the springs, can be detachably secured to the same, an embodiment is advantageous, wherein each of the means, in particular each spring, can be secured to the grinding element holder in two different directional positions. An attachment option of the springs to the grinding element holder, which is dependent on the direction of rotation, is thus provided. According to a preferred embodiment, the means, in particular the springs, can be secured to the grinding element holder by clamps.

An embodiment is particularly advantageous, wherein the means for the, particularly radial, removal of the abrasion debris occurring during commutation are constructed from the same material as the associated casing of the grinding element holder, in which a sliding contact, in particular a carbon brush, is adjustable in the radial direction with respect to the commutator. The means are preferably made from plastic, preferably from electrically non-conductive plastic, in order to avoid short circuits.

As mentioned at the beginning of the application, an embodiment can be implemented, wherein the means for removal of the abrasion debris are integrally configured with the grinding element holder and/or integrally with the associated casing, particularly in each case in the form of a one-piece extension. It is thereby advantageous with regard to an efficient and cost effective manufacture if the means with the associated casing are manufactured as a single injection molded part. It is particularly advantageous for all of the casings to be configured as a single injection molded part with the associated means.

Provision is advantageously made when modifying the invention for the exterior contour of the means to be fit to the exterior contour of the commutator, which is rotatably arranged. For this purpose, the means are preferably configured in a curved fashion on the side facing the commutator in the direction of the circumferential extension of the commutator.

In order to provide an optimal removal of the abrasion debris occurring during the operation of the commutation device in the radial direction outwards, an embodiment is preferred, wherein the means, particularly in the region of their free end, are shaped in a ramp-like manner, the ramp which is formed preferably ascending in the direction of the respectively adjacent, respectively associated, casing. In this manner, the abrasive particles are slung, respectively carried, in the direction of the casing's exterior wall, which lies outside of the commutator and extends in the radial direction.

As mentioned earlier, an embodiment can be implemented, wherein the means, in particular at least one spring, externally rest on the commutator during rotation of the same. Particularly in the embodiment, wherein the means are not configured as springs, i.e. not elastic but rigid, an embodiment is preferred, wherein a gap extending in the circumferential direction is configured between the means and the commutator. In so doing, an embodiment can be implemented, wherein the width extension of the gap in the circumferential direction is at least approximately constant and minimal. An embodiment can however also be implemented, wherein the gap width decreases towards the free end of the means, which are preferably configured in a ramp-like manner, in the circumferential direction opposite to the direction of rotation.

Therefore not only one embodiment having means comprising at least one spring for removing abrasion debris can be implemented; but also particularly on account of cost considerations and for ease in assembly, an embodiment having rigid means per se, which are preferably integrally configured with at least one additional component of the commutation device, is possible in order to avoid a separate assembly of the means.

The invention also leads to an electric machine, in particular an electric motor or a generator, having a commutation device as previously described, the commutator of the commutation device being disposed in a torque-proof manner on the armature shaft. By providing a commutation device configured according to the concept of the invention, pre-commutations are avoided and consequently the runtime of the electric machine is increased with respect to known electric machines.

BRIEF DESCRIPTION OF THE DRAWINGS

In the figures the same components and components having the same function are referred to using the same reference numerals. The following are shown.

DETAILED DESCRIPTION

Figure 1:
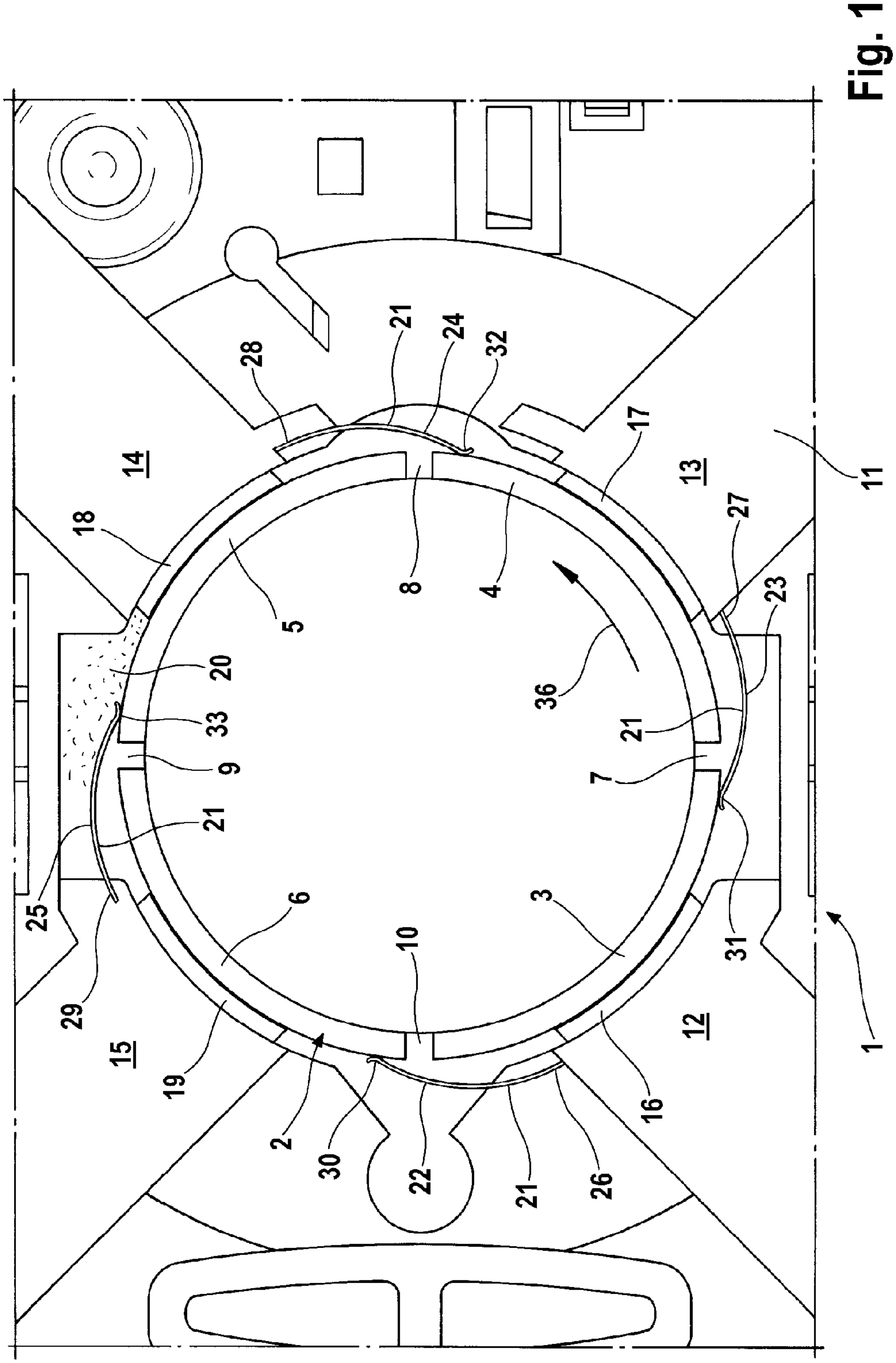
FIG. 1 is a section of a commutation device, in which means for removing abrasion debris are associated with each grinding element.

In the figures the same components and components having the same function are referred to using the same reference numerals.

In FIG. 1 a commutation device 1 for an electric machine is shown. The commutation device 1 comprises a commutator 2 for the torque-proof disposal on an undepicted armature shaft, which is perpendicular to the drawing plane. In the embodiment depicted, the commutator 2 comprises four segments 3, 4, 5, 6 made of copper and arranged side by side in the circumferential direction. The segments 3, 4, 5, 6 are electrically conductively connected to undepicted armature windings of an armature stack. An air gap 7, 8, 9, 10 extending in the axial direction is located between each two adjacent segments for electrically insulating the segments 3, 4, 5, 6 from one another.

The commutator 2 is disposed within a grinding element holder 11, which in this embodiment has four casings 12, 13, 14, 15, which are uniformly spaced in the circumferential direction, for in each case one grinding element 16, 17, 18, 19 (carbon brush). Each grinding element 16, 17, 18, 19 is spring biased radially inwardly towards the commutator 2 so that the grinding elements 16, 17, 18, 19 more exactly abut against the segments 3, 4, 5, 6 on the outer circumference of the commutator 2 and electrically contact said segments 3, 4, 5, 6 when the commutator rotates. Abrasion debris 20 (powdered carbon) occurs as a result of the friction between the commutator 2 and the grinding elements 16, 17, 18, 19. Means 21 for removing abrasion debris are provided for the removal of said debris 20 in the radial direction outwards. Said means 21 for removing abrasion debris, which are detachably secured to the grinding element holder 11, comprise four springs 22, 23, 24, 25, which are spaced apart from one another in the circumferential direction and in each case are configured as a plastic leaf spring. The axial extension of the springs 22, 23, 24, 25, i.e. their extension into the drawing plane, substantially corresponds to the axial extension of the segments 3, 4, 5, 6. The springs 22, 23, 24, 25 are curved towards the commutator in the radial direction inwards, whereby a resilient force is achieved in the radial direction. The springs 22, 23, 24, 25 bear on the outer circumference of the commutator 2, respectively the segments 3, 4, 5, 6, with their respective free end 30, 31, 32, 33 and lead the abrasion debris 20 occurring during rotation of said commutator 2 away in the radial direction outwards.

As can be seen from FIG. 1, the springs 22, 23, 24, 25 are bent outward slightly in the region of their respective free end 30, 31, 32, 33 in order to assure a smooth start-up.

As can be seen from FIG. 1, a spring 22, 23, 24, 25 is associated with each grinding element 16, 17, 18, 19, said spring 22, 23, 24, 25 when viewed in the direction of rotation 36 being disposed in front of the respective grinding element 16, 17, 18, 19. In the event that the direction of rotation 36 of the commutator 2 should be changed, it is possible to fit the springs 22, 23, 24, 25 to the grinding element holder 11 such that they do not extend as shown in a clockwise direction and radially inwards but in a counterclockwise direction and radially inwards in order to thereby assure a removal of abrasion debris 20 radially outwards.

Figure 2:
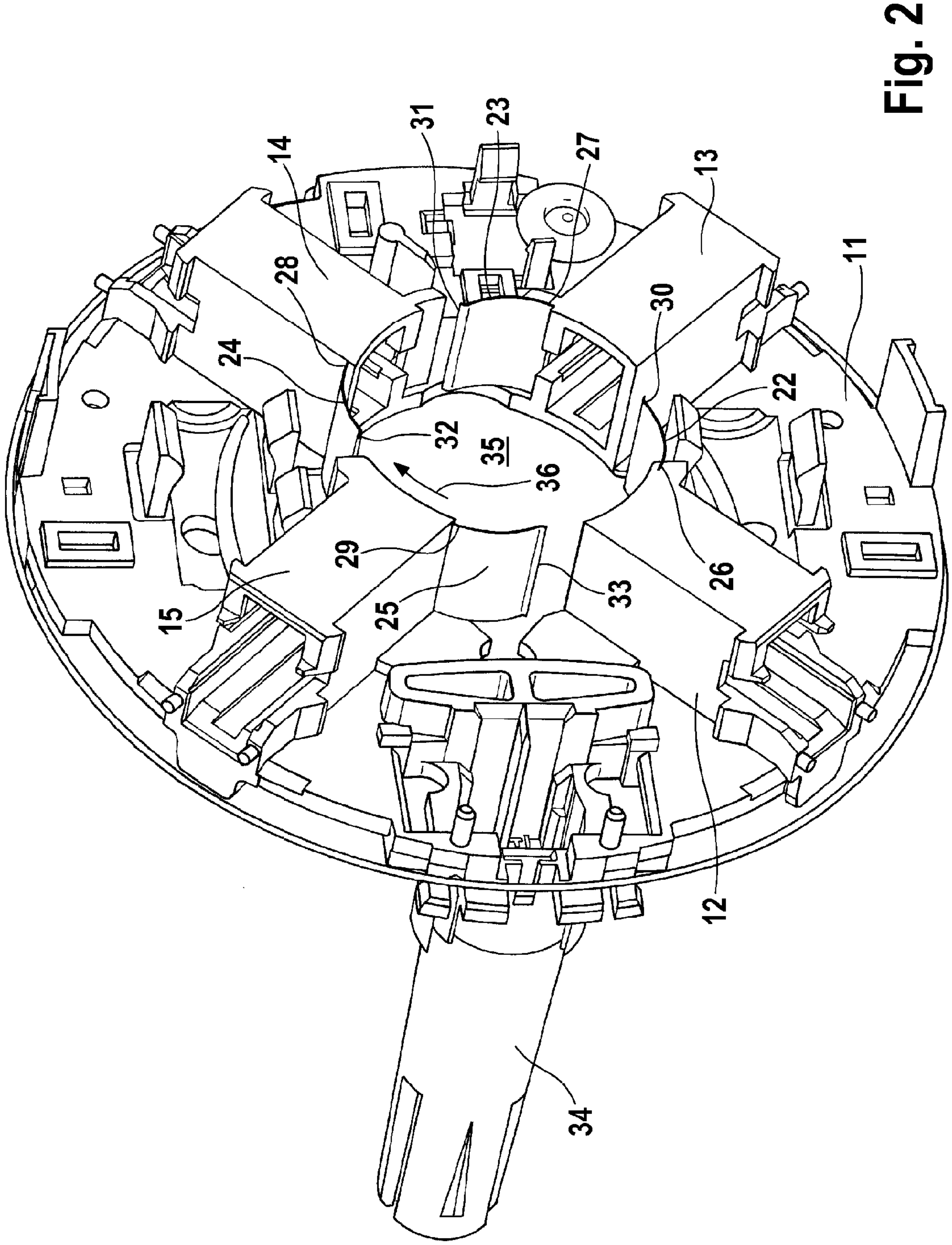
FIG. 2 is a grinding element holder of the commutation device according to FIG. 1.

In FIG. 2 a grinding element holder 11 is shown by itself. A hollow extension 34, which faces rearward in the drawing plane, for accommodating contacts of an electric machine can be seen. In its forward region in the drawing plane, the grinding element holder 11 is configured disc-shaped and has four casings 12, 13, 14, which are arranged offset in relation to one another in each case by 90 E, for respectively one undepicted grinding element. In the casings 12, 13, 14, 15, a grinding element is in each case spring biased radially inwardly towards the commutator 2.

In the assembled state, a commutator 2 is disposed in a central opening 35. The undepicted commutator rotates in a clockwise direction (arrow 36) in the depicted configuration of the grinding element holder 11.

A spring 22, 23, 24, 25 configured as a leaf spring is detachably secured to each casing 12, 13, 14, 15 at its end 26, 27, 28, 29 facing away from the opening 35. The springs 22, 23, 24, 25 starting at the respective casing 12, 13, 14, 15 extend in a counterclockwise direction and are curved inwards. Their free ends 30, 31, 32, 33 are bent radially outwards in the direction away from the opening 35 in order to assure a smooth start-up of the commutator and thereby to prevent them from getting caught in the air gaps 7, 8, 9, 10 between the segments 3, 4, 5, 6 of the commutator 2.

The abrasion debris 20, which is led away outwards, falls due to gravity in a region outside of the commutator 2 down into the undepicted housing of the electric machine and can be removed from time to time as required.

Figure 3:
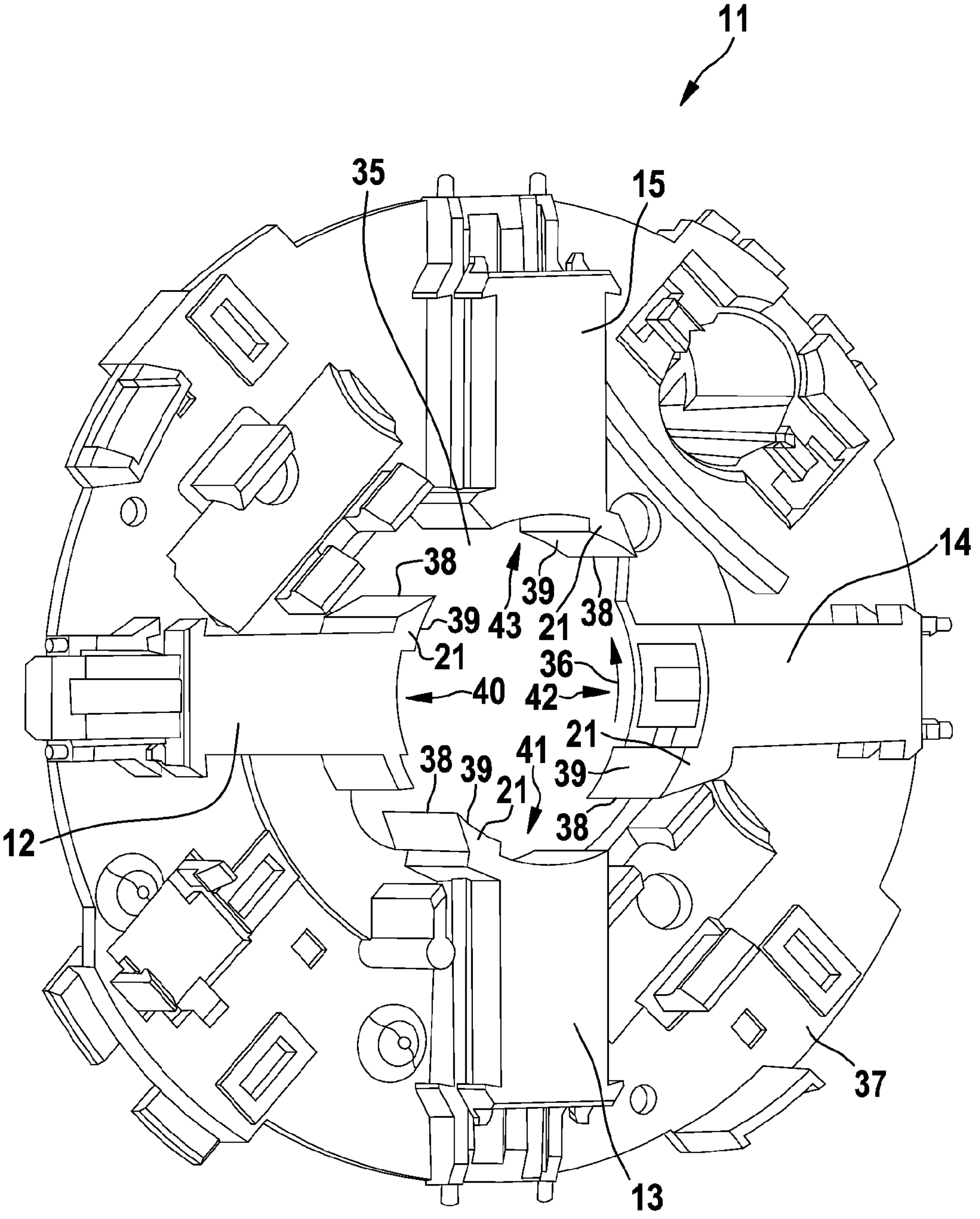
FIG. 3 is an alternately configured grinding element holder having means for removing the abrasion debris, which are integrally configured with the casings for the grinding elements.

An alternately configured grinding element holder 11 is shown in FIG. 3. The grinding element holder 11 comprises casings 12, 13, 14, 15 distributed uniformly in the circumferential direction for in each case one undepicted grinding element 16, 17, 18, 19 (analogous to FIG. 1). Furthermore with regard to the grinding element holder 11 shown in FIG. 3, abrasion debris occurs as a result of the friction between the commutator, which for the sake of clarity is not shown but is to be disposed in the central opening 35, and the grinding element. In order to remove the abrasion debris in the radial direction outwards, means 21 for removing said abrasion debris are associated with each casing 12, 13, 14, 15. The means 21 are in each case integrally embodied together with the associated casing 12, 13, 14, 15 as rigid extensions, the casings 12, 13, 14, 15 in turn being integrally configured with a base plate 37 of the grinding element holder 11. The grinding element holder 11 shown in FIG. 3 together with the undepicted commutator forms a commutation device for an electric machine. As is apparent in FIG. 3, the rotational direction 36 of the undepicted commutator runs in the counterclockwise direction. The means 21 in the example of embodiment according to FIG. 3 are configured as integral extensions of the casings 12, 13, 14, 15, which starting at the associated casing 12, 13, 14, 15 extend in the circumferential direction opposite to the direction of rotation 36. The means 21 are configured in a ramp-like manner and taper in the direction of their free ends 38. In other words, the radial extension of the means configured as extensions increases in the counterclockwise direction.

As is furthermore apparent in FIG. 3, a (bottom, respectively radially inner) side 39 of the means 21 configured as extensions is disposed offset radially inward with respect to an associated radially inner casing opening 40, 41, 42, 43, whereby a barrier acting in the circumferential direction is formed, whereby abrasion debris is prevented from (excessively) impinging on the carbon brushes, which are not shown in FIG. 3.

The sides 39 of the means 21 facing the commutator are configured so as to be curved in the circumferential direction and are disposed at a distance from the undepicted commutator, only a minimal circumferential gap having in this embodiment a constant radial extension in the circumferential direction of 0.5 mm being formed between the sides 39 and the commutator.

The invention claimed is:

1. Commutation device comprising:

a rotatable commutator;

at least one grinding element contacting the commutator;

means for removing abrasion debris occurring during commutation, wherein the means for removing abrasion debris is a spring that rests on the commutator; and a grinding element holder having a plurality of casings for accommodating in each case one grinding element, wherein the means can be secured to the grinding element holder in two different directional positions as a function of the rotational direction of the commutator.

2. Commutation device according to claim 1, wherein the means comprises at least one electrically non-conductive spring that rests on the commutator.

3. Commutation device according to claim 2, wherein the spring is configured as a leaf spring, which is curved and/or obliquely disposed in the direction of the commutator.

4. Commutation device according to claim 1, wherein the means is constructed from an electrically non-conductive plastic.

5. Commutation device according to claim 1, wherein the width of the means at least approximately corresponds to the axial extension of the commutator or projects axially beyond said commutator.

6. Commutation device according to claim 1, wherein the means has a curved or oblique leading edge in the region of their (its) free end that rests on the commutator.

7. Commutation device according to claim 1, wherein the spring, when viewed in the direction of rotation of the commutator, rests on the commutator in front of the casing and is associated with at least one casing.

8. Commutation device according to claim 7, wherein the means is constructed from the same material, as the associated casing of the grinding element holder.

9. Commutation device according to claim 7, wherein the means together with the associated casing(s) are configured as a single injection molded part.

10. Commutation device according to claim 1, wherein the means is integrally configured with the grinding element holder or can be secured to the same.

11. Commutation device according to claim 1, wherein the means is curved on the side facing the commutator in the direction of the circumferential extension of the commutator.

12. Commutation device according to claim 1, wherein the means is configured in a ramp-like manner.

13. Commutation device according to claim 1, wherein a, minimal, circumferential gap is configured between the means and the commutator.

14. Electric machine, in particular an electric motor or a generator, having a commutation device according to claim 1, whose commutator is disposed in a torque-proof manner on an armature shaft.

* * * * *